(12) United States Patent
Belaustegi Ituarte et al.

(10) Patent No.: US 11,845,664 B2
(45) Date of Patent: Dec. 19, 2023

(54) CAPACITIVE DEIONIZATION ELECTRODE

(71) Applicant: FUNDACIÓN TECNALIA RESEARCH & INNOVATION, San Sebastián—Guipúzcoa (ES)

(72) Inventors: Yolanda Belaustegi Ituarte, San Sebastián—Guipúzcoa (ES); Saioa Zorita Castresana, San Sebastián—Guipúzcoa (ES); Francisco José Fernández Carretero, San Sebastián—Guipúzcoa (ES); Alberto García Luís, San Sebastián—Guipúzcoa (ES); David Alfredo Pacheco Tanaka, San Sebastián—Guipúzcoa (ES); Pablo Benguria Uribe, San Sebastián—Guipúzcoa (ES)

(73) Assignee: FUNDACIÓN TECNALIA RESEARCH & INNOVATION, San Sebastián-Guipúzcoa (ES)

(*) Notice: Subject to any disclaimer, the term of this patent is extended or adjusted under 35 U.S.C. 154(b) by 794 days.

(21) Appl. No.: 16/628,948

(22) PCT Filed: Jun. 27, 2018

(86) PCT No.: PCT/EP2018/067307
§ 371 (c)(1),
(2) Date: Jan. 6, 2020

(87) PCT Pub. No.: WO2019/007784
PCT Pub. Date: Jan. 10, 2019

(65) Prior Publication Data
US 2021/0363015 A1 Nov. 25, 2021

(30) Foreign Application Priority Data
Jul. 5, 2017 (EP) .................................. 17382438

(51) Int. Cl.
*C01B 32/198* (2017.01)
*C02F 1/461* (2023.01)
(Continued)

(52) U.S. Cl.
CPC .......... *C01B 32/198* (2017.08); *B01J 23/745* (2013.01); *B01J 27/20* (2013.01); *C02F 1/4691* (2013.01);
(Continued)

(58) Field of Classification Search
CPC . B01J 23/745; B01J 27/20; B01J 37/08; B01J 37/32; C01B 32/198; C02F 1/46109;
(Continued)

(56) References Cited

U.S. PATENT DOCUMENTS

2012/0168383 A1 7/2012 Koo et al.

OTHER PUBLICATIONS

Yin et al ("Three-Dimensional Graphene/Metal Oxide Nanoparticle Hybrids for High-Performance Capacitive Deionization of Saline Water", Advanced Materials, vol. 25, Issue 43 p. 6270-6276). (Year: 2013).*

(Continued)

*Primary Examiner* — Coris Fung
*Assistant Examiner* — Catriona M Corallo
(74) *Attorney, Agent, or Firm* — CANTOR COLBURN LLP

(57) ABSTRACT

A process for the manufacturing of 3D reduced graphene oxide/$Fe_2O_3$ material includes the following steps: (i) putting in contact a graphene oxide (GO) water dispersion with an aqueous solution of iron(II) sulfate; (ii) hydrothermal treatment; and (iii) freezing the reaction product obtained in step (ii) at a temperature $\leq -5°$ C.; and (iv) lyophilisation. A 3D reduced graphene oxide/$Fe_2O_3$ material is obtainable by the process and further relates to electrodes for CDI devices having the material. A method for removing ions from a (Continued)

fluid, like saline water, using the capacitive deionization device includes applying a voltage to the electrodes while supplying the fluid into the capacitive deionization device.

8 Claims, 9 Drawing Sheets

(51) Int. Cl.
  *C02F 1/469* (2023.01)
  *B01J 27/20* (2006.01)
  *B01J 23/745* (2006.01)
  *B01J 37/08* (2006.01)
  *B01J 37/32* (2006.01)

(52) U.S. Cl.
  CPC ........... *C02F 1/46109* (2013.01); *B01J 37/08* (2013.01); *B01J 37/32* (2013.01); *C02F 2001/46138* (2013.01); *C02F 2305/08* (2013.01)

(58) Field of Classification Search
  CPC .......... C02F 1/4691; C02F 2001/46138; C02F 2305/08
  See application file for complete search history.

(56) References Cited

OTHER PUBLICATIONS

Yang et al. "Graphene oxide-iron oxide and reduced graphene oxide-iron oxide hybrid materials for the removal of organic and inorganic pollutants", RSC Advances, p. 8821-8826, Jul. 26, 2012. (Year: 2012).*

Simon-Herrero et al. "Effects of freeze-drying conditions on aerogel properties", J Mater Sci, p. 8977-8985, Jun. 28, 2016. (Year: 2016).*

Pajonk, G. "Drying Methods Preserving the Textural Properties of Gels", Journal de Physique Colloques, p. C4-13-C4-22. Jan. 1, 1989. (Year: 1989).*

Yun et al. "Phase-Controlled Iron Oxide Nanobox Deposited on Hierarchically Structured Graphene Networks for Lithium Ion Storage and Photocatalysis", 2016. Scientific Reports, p. 1-9. (Year: 2016).*

Gu Xiaoyu et al, "Fabrication of mesoporous graphene electrodes with enhanced capacitive deionization", Electrochimica Acta, Elsevier Science Publishers, Barking, GB, vol. 182, Sep. 16, 2015 (Sep. 16, 2015), p. 183-191, XP029401520.

Haibo Li et al, "Hydrothermally synthesized graphene and Fe3O4 nanocomposites for high performance capacitive deionization", RSC Advances: an International Journal to Further the Chemical Sciences, vol. 6, No. 15, Jan. 1, 2016 (Jan. 1, 2016), p. 11967-11972, XP055421704.

International Search Report dated Jul. 30, 2018 re: Application No. PCT/EP2018/067307, pp. 1-5, citing: H. Yin et al., Yang Shuhua et al., L. Xiao et al., Xiaoyu Gu et al., Li Haibo et al., US 2012/0168383 A1.

Shuhua Yang et al, "Self-Assembled alpha-Fe2O3 Mesocrystals/Graphene Nanohybrid for Enhanced Electrochemical Capacitors", Small, vol. 10, No. 11, Jun. 1, 2014 (Jun. 1, 2014), p. 2270-2279, XP055421774.

Written Opinion dated Jul. 30, 2018 re: Application No. PCT/EP2018/067307, pp. 1-5, citing: H. Yin et al., Yang Shuhua et al., L. Xiao et al., Xiaoyu Gu et al., Li Haibo et al., US 2012/0168383 A1.

Xiao L et al, "Direct self-assembly of Fe2O3/reduced graphene oxide nanocomposite for high-performance lithium-ion batteries", Journal of Materials Chemistry a Royal Society of Chemistry GBR, vol. 3, No. 21, Jun. 7, 2015 (Jun. 7, 2015), p. 11566-11574, XP002775331.

Yin H et al, "Three-dimensional graphene/metal oxide nanoparticle hybrids for high-performance capacitive deionization of saline water", Advanced Materials, vol. 25, No. 43, Nov. 20, 2013 (Nov. 20, 2013), p. 6270-6276, XP002775330.

* cited by examiner

CAPACITIVE DEIONIZATION ELECTRODE

TECHNICAL FIELD

The present disclosure relates to a 3D reduced graphene oxide/$Fe_2O_3$ material for use in the preparation of a capacitive deionization electrode, and to a process for manufacturing same. The disclosure also relates to a capacitive deionization device (CDI) for water deionization comprising said capacitive deionization electrode and to a method of removing ions from a fluid using the capacitive deionization device.

BACKGROUND

Fresh water scarcity is one of the major problems for more than a billion people around the world, mostly in arid developing countries. The World Health Organization predicts that by mid-century, four billion of us—nearly two-thirds of the world's present population—will face severe fresh water shortages, meaning that effective steps have to be taken, in terms of increasing water supply or managing water demand, to overcome this problem. Since 97.5% of water supplies are saltwater and only 0.3% of freshwater sources are readily drinkable, desalination is a key technology to increase both the quantity and quality of water supply. Commercial desalination technologies include reverse osmosis (RO) and thermal process (MSF). However, these processes consume large amounts of energy (2.9-3.7 kWh/$m^3$ of treated water for RO vs 4 kWh/$m^3$ for MSF) and have high maintenance costs. On the contrary, capacitive deionization (CDI), based on electrosorption, is membrane free and operates at low voltages which make it a promising low cost water desalination technique.

In the CDI process, ions from salty water are sequestered in an electrical double layer formed at the porous surface of the externally charged electrodes once exposed to an electrical field between the electrodes. This electrosorption process is mainly dependent on the physical properties and nanostructure of the electrode material, such as electrical conductivity, pore size distribution and pore structure. Although the concept of CDI was conceived in 1960s, CDI based desalination techniques are still far from practical use due mainly to the lack of suitable electrode materials with high electrosorption capacity and rate.

Generally carbon materials with high electrical conductivity and tunable structural properties have been considered as promising electrode materials for CDI. The list of carbon materials reported in literature includes graphene, carbon nanofibers, carbon nanotubes, activated carbons, carbon aerogels and their composites. Nevertheless, the NaCl adsorption capacity of all the above mentioned carbon-based materials is in the range of 0.1-10 mg/g, which is much lower than the theoretical estimations. Among these materials, graphene as a robust two dimensional (2D) sheet of sp2-hybridized carbon perfectly meets the requirement of high specific surface area, excellent electronic conductivity, and good chemical and electrochemical stability. Furthermore, graphene sheets can easily self-assemble into 3D networks, offering a large number of accessible open pores to NaCl in solution.

The incorporation of metal oxide nanoparticles such as $TiO_2$, $Fe_2O_3$, ZnO and $MnO_2$ on graphene electrodes can provide high CDI desalination efficiency with improved physicochemical properties such as high hydrophilicity to increase the wettability of the electrode, or alteration of the surface zeta-potential on the graphene electrode to increase the ion removal rate.

Among the commonly utilized metal oxides nanoparticles, $Fe_2O_3$ is one of the more promising electrode materials due to its low cost, good chemical inertia, being eco-friendly, and ease of anchoring into the carbon structure; moreover it enhances the adsorption capacity in a CDI system.

Despite the developments so far, there is still a need in the state of the art to provide improved electrode materials based on graphene and metal oxide nanoparticles, with advantageous electrochemical properties, such as high specific surface and/or high specific capacitance for use in CDI processes.

BRIEF DESCRIPTION OF THE DRAWINGS

FIG. 3: Nitrogen adsorption/desorption isotherms and pore size distributions (inset) of rGO/$Fe_2O_3$ material of example 1a.

FIG. 4: Raman spectra of the rGO/$Fe_2O_3$ material of example 1a.

FIG. 5: Thermogravimetric analysis of the rGO/$Fe_2O_3$ material of example 1a.

FIG. 7: shows the specific capacitance Cs (F/g) vs scan rate (mV/s) results of the rGO/$Fe_2O_3$ electrode of the disclosure using the material of example 1a.

FIG. 8: shows the Nyquist impedance plot for the rGO/$Fe_2O_3$ electrode of the disclosure using the material of example 1a.

FIG. 10: shows the variation of conductivity at different NaCl concentrations vs time for the rGO/$Fe_2O_3$ electrode of the disclosure using the material of example 1a.

DETAILED DESCRIPTION OF THE DRAWINGS

Figure 1A:
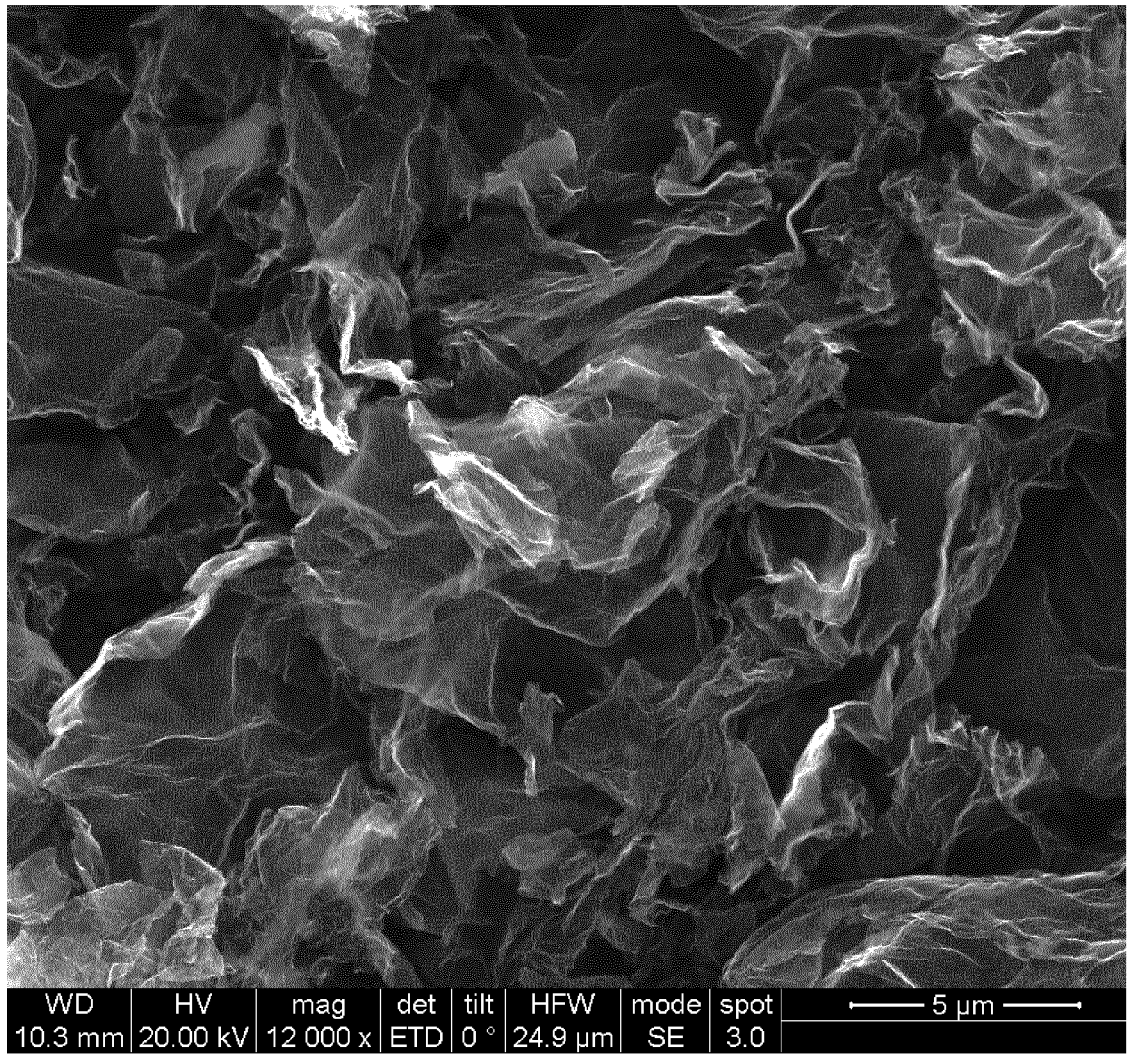
FIGS. 1A, 1B and 1C: Scanning electron micrographs of the rGO/$Fe_2O_3$ material of example 1a at scale bar=1 µm, scale bar=5 µm, and scale bar=400 nm respectively.

The present inventors have surprisingly discovered an improved new process for obtaining a new 3D reduced graphene oxide/$Fe_2O_3$ material with high specific capacitance for use in the manufacturing of electrodes suitable for CDI devices and water deionization processes. The new process is based on the use of iron (II) sulfate with a graphene oxide water dispersion, hydrothermal treatment of the resulting mixture followed by freezing and lyophilisation which renders a rGO/$Fe_2O_3$ material with an advantageous porosity and pore size distribution, allowing fast transport of the electrolyte solution to the adsorption sites and high specific capacity.

Accordingly, the present disclosure relates in a first aspect to a new process for obtaining a 3D reduced graphene oxide/$Fe_2O_3$ material which comprises the following steps:
 (i) putting in contact a graphene oxide (GO) water dispersion with an aqueous solution of iron (II) sulfate,
 (ii) hydrothermal treatment of the resulting dispersion from previous step (i), (iii) freezing the reaction product obtained in step (ii) at a temperature ≤−5° C.; and (iv) lyophilisation of the product obtained in step (iii).

In principle there is no particular limitation concerning the graphene oxide (GO) water dispersion that can be used as starting material. In this sense the graphene oxide (GO) water dispersion can have a concentration within a wide range, typically from 2 mg/ml to 10 mg/ml. In a particular embodiment, water dispersions of graphene oxide are obtained by Hummers method. Water dispersions of graphene oxide are commercially available.

An aqueous solution of iron (II) sulfate for use as starting material may be prepared for use in the disclosure, and have different concentrations, typically between 0.1 and 1 M. In a particular embodiment the concentration is for example 0.2 M, or 0.3 M, or 0.4 M or 0.5 M, or 0.6 M or 0.7 M, or 0.8 M or 0.9 M. In a particular embodiment is 0.5 M. In a particular embodiment the salt is the heptahydrate: $FeSO_4·7H_2O$.

The GO water dispersion and the aqueous solution of iron (II) sulfate are typically contacted in a weight ratio of GO to iron (II) sulfate ($FeSO_4$) of between 1:0.2 and 1:20. In a particular embodiment the weight ratio is between 1:0.6 and 1:15. In another particular embodiment the molar ratio is between 1:1 and 1:10, for example 1:2.5.

The resulting dispersion of GO and iron (II) sulfate in step (i) shows typically a pH value of about 2.0. The resulting pH value can be maintained, or raised according to a particular embodiment of the process, with a base. In a preferred embodiment the base is a $NH_4OH$ solution. Accordingly the pH can be raised to a pH value equal to or lower than 10, e.g. pH 3, or pH 4, or pH 5, or pH 6, or pH 7, or pH 8, or pH 9 or pH 10. Preferably the pH is adjusted to pH between 7 and 9.5, more preferably between 8 and 9, like 8.3, or 8.5 or 8.7 or 8.9.

The resulting dispersion from step (i), which pH value has been optionally raised as above disclosed, is then submitted in step (ii) to a hydrothermal treatment; for example in an autoclave. Hydrothermal treatment is usually carried out at temperatures equal or higher than 90° C., preferably between 90° C. and 190° C., more preferably between 120° and 185° C., for example at 180° C. Reaction times may vary until the reactions are completed. Usually reaction times vary between 10 h and 20 h, and may be, for example 11 h, or 12 h, or 13 h, or 14 h, or 15 h, or 16 h, or 17 h, or 18 h or 19 h. In a preferred embodiment the time is 14 h, 15 h or 16 h, more preferably 16 h.

According to a particular embodiment, the reaction product after step (ii) is washed, preferably with water, and then optionally dried. Drying may be carried out, typically until the size of the reaction product is reduced by between 30 and 85 weight. The drying temperature is in a particular example about 100° C. Times vary depending on factors such as the amount of product, but typically times are about 30 m. However, time and temperature depend on factors such as the amount and size of the reaction product.

In a particular embodiment the reaction product is then frozen in step (iii) at a temperature equal to or lower than −10° C., preferably of between −20° C. and −90° C., more preferably at a freezing temperature between about −60° C. and −85° C., and even more preferably at −80° C. In another embodiment liquid nitrogen is used for step (iii).

It has been shown that the freezing temperature influences the final structural characteristics of the rGO/$Fe_2O_3$ material, and with that, the electrochemical properties, in particular, the specific capacitance (Cs).

Subsequently the resulting product from step (iii) is lyophilized in step (iv). The lyophilisation is carried in a conventional manner, in a conventional apparatus. In a particular embodiment the frozen product is lyophilized at 63 Pa and −10° C.

The present disclosure also relates in another aspect to the 3D reduced graphene oxide/$Fe_2O_3$ material obtained by the process as defined above.

This new 3D reduced graphene oxide/$Fe_2O_3$ material, herein also referred to as the rGO/$Fe_2O_3$ material, or as the rGO/$Fe_2O_3$ material of the disclosure, presents a 3D structure with open pores, and grafted nanoparticles of metal oxide randomly—distributed within the reduced 3D graphene oxide matrix. The porosity characterization studies indicate the presence of macropores (>50 nm) and mesopores (between 2 and 50 nm) which guarantee a huge space for ion accommodation in CDI processes, as well as micropores (<2 nm).

Figure 1B:
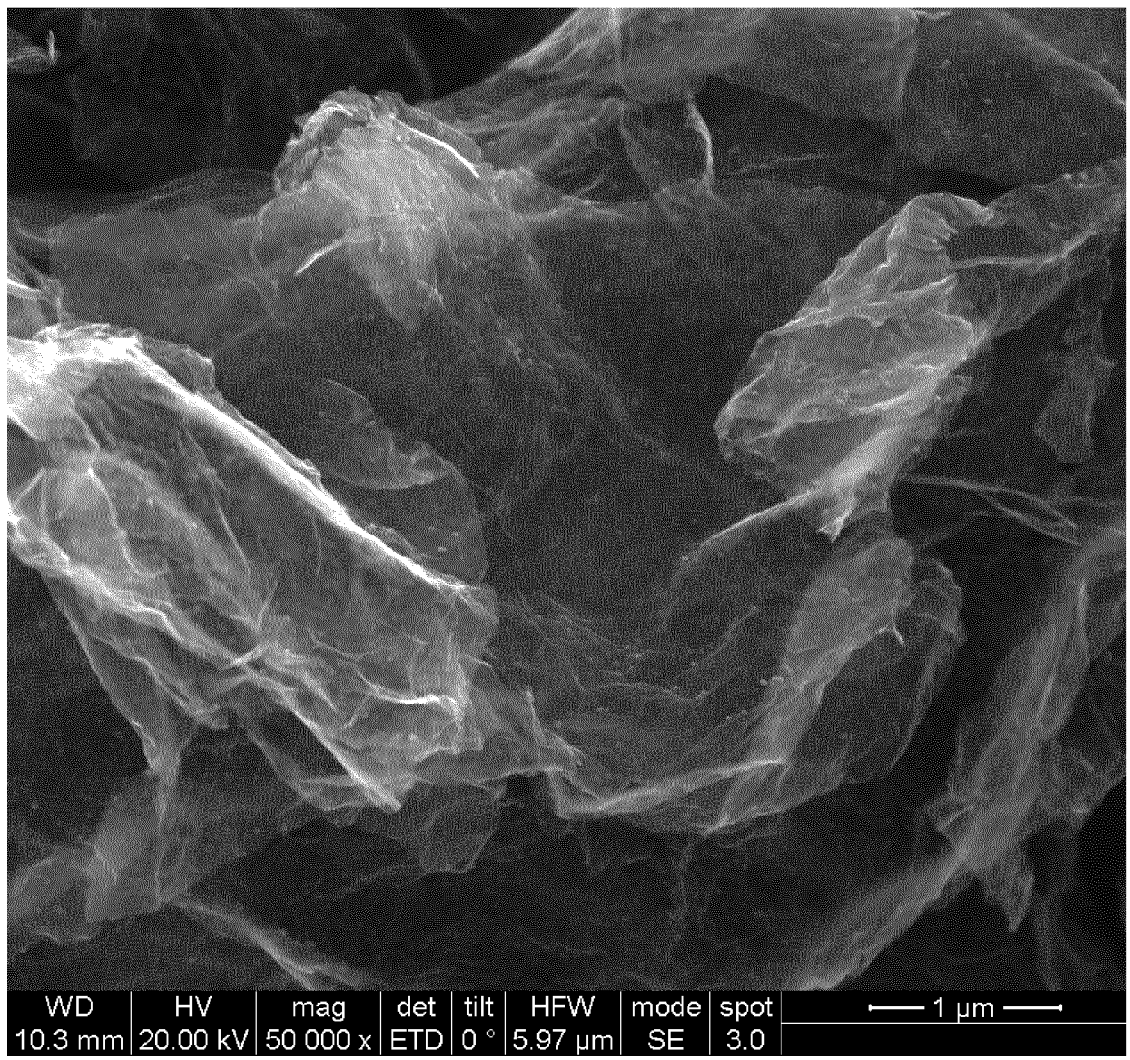
Figure 1C:
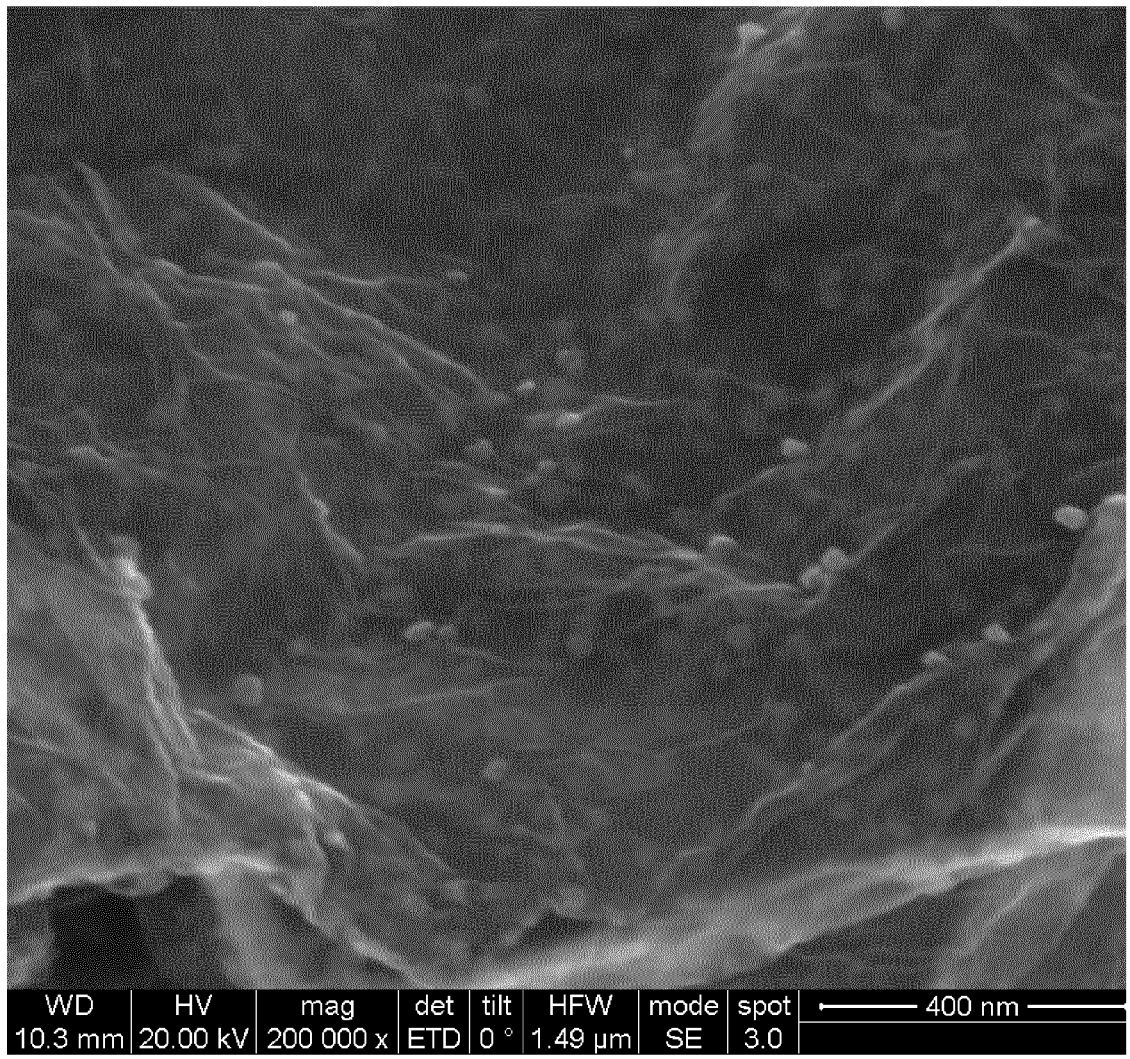

Scanning electron micrographs of the rGO/$Fe_2O_3$ material of the disclosure according to example 1a are shown in FIG. 1 at different scales: FIG. A) scale bar=1 μm, FIG. B) scale bar=5 μm, FIG. C) scale bar=400 nm. There, this characteristic porosity of open pores can be observed.

The average diameter of the nanoparticles of metal oxide has been determined to be about between 20-100 nm also by scanning electron microscope. According to a particular embodiment the average nanoparticle diameter is about 40 nm. According to another particular embodiment the average nanoparticle diameter is about 30 nm (see FIG. 1B and FIG. 1C, the scanning electron micrographs of the rGO/$Fe_2O_3$ material of example 1a where the nanoparticles can be clearly seen as white spots).

Figure 3:
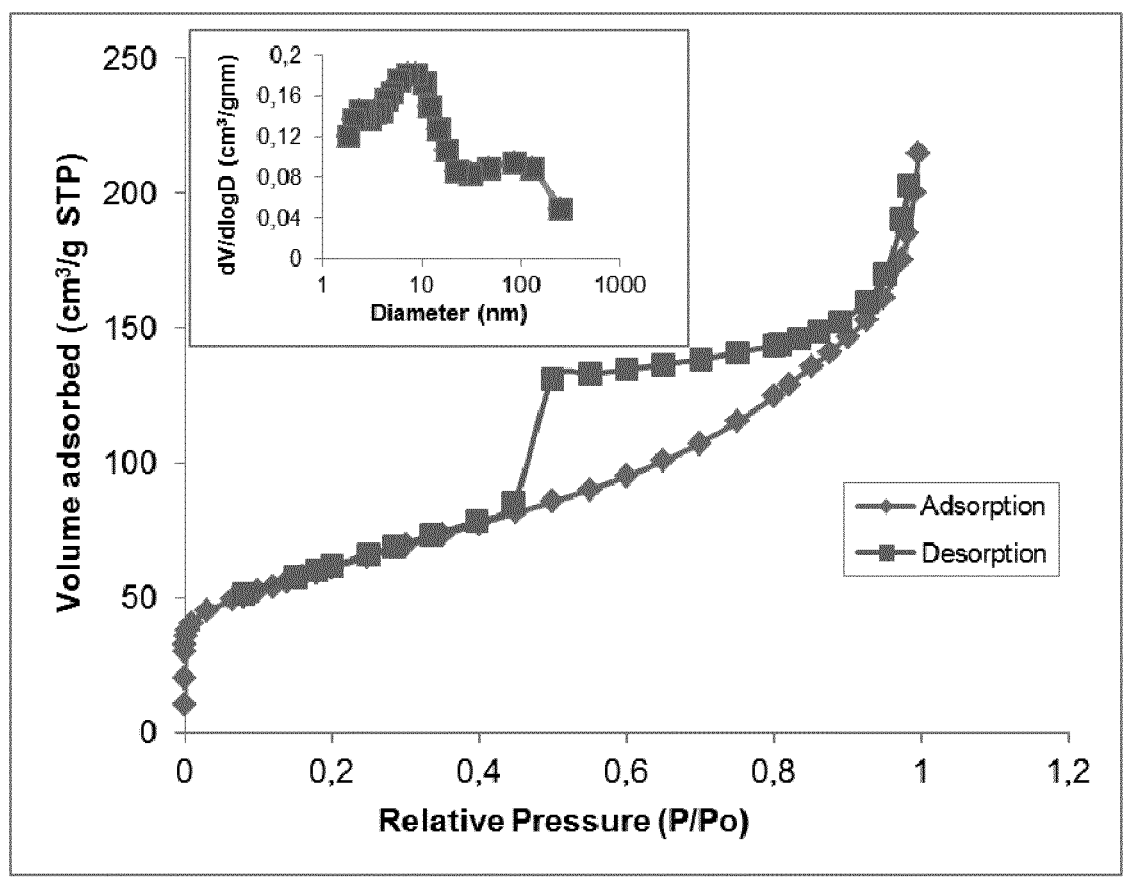

The specific surface area (BET) and pore size distribution of the rGO/$Fe_2O_3$ material of the disclosure has been determined by the nitrogen adsorption/desorption technique. In particular the result of the rGO/$Fe_2O_3$ material of example 1a is shown in FIG. 3, which exhibits a hysteresis loop at the P/Po value of 0.4-0.8 which indicates a mesoporous structure. The BET of the rGO/$Fe_2O_3$ material of example 1a, has been determined to be 212 $m^2/g$. The inset in FIG. 3 further shows the characteristic pore size distribution of the rGO/$Fe_2O_3$ material of the disclosure. The achieved porosity in the rGO/$Fe_2O_3$ material is beneficial to easy access by ions and allows fast transport of the electrolyte solution to the adsorption sites.

The micropore volume of the rGO/$Fe_2O_3$ material of the disclosure has been calculated by the t-plot method as explained in the examples to be, in general, between 0.00574 $cm^3/g$ and 0.0146 $cm^3/g$. The micropore volume of the rGO/$Fe_2O_3$ material of example 1a has been calculated to be 0.00923 $cm^3/g$.

Figure 2:
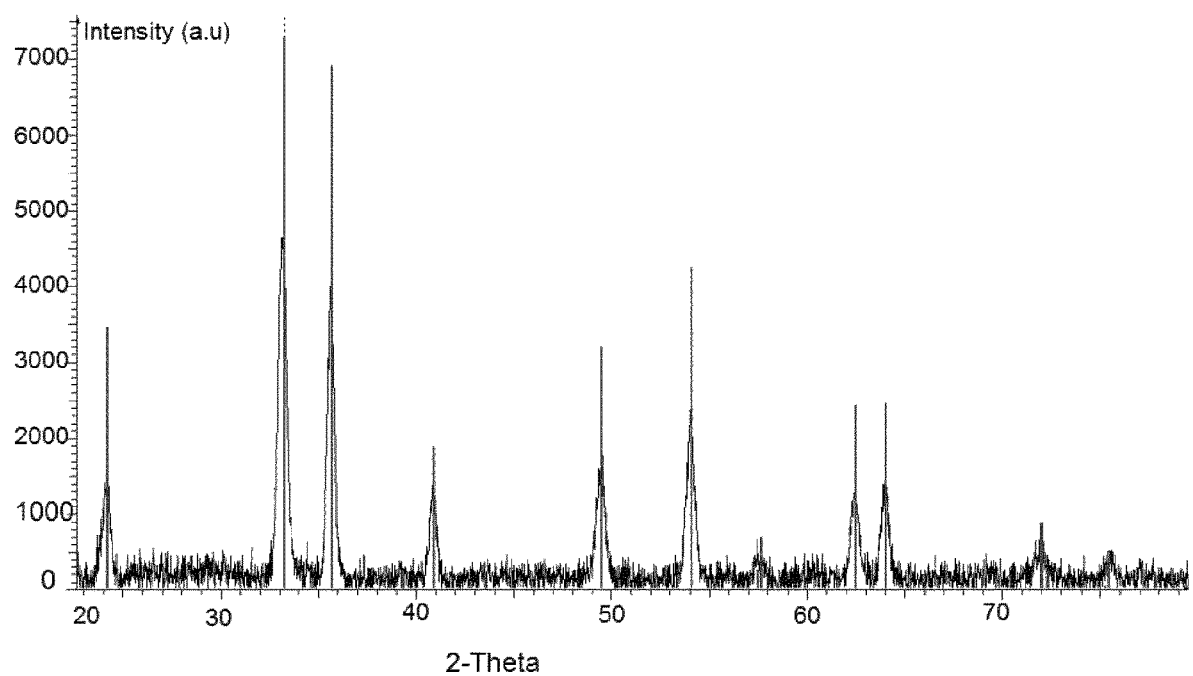
FIG. 2: X-ray diffraction pattern of rGO/$Fe_2O_3$ material of example 1a (confirming the formation of magnetite: $Fe_2O_3$).
Figure 5:
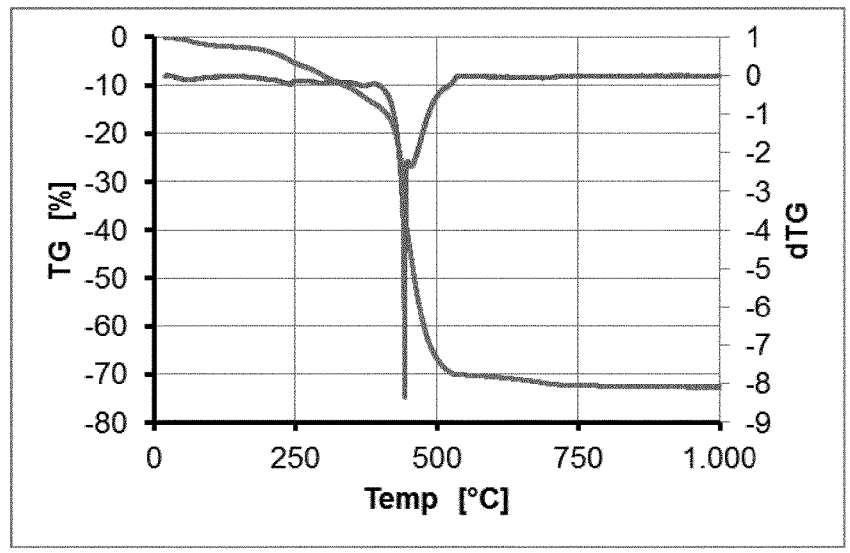

The rGO/$Fe_2O_3$ material of the disclosure has been characterized by X-ray diffraction. The result of the rGO/$Fe_2O_3$ material of example 1a is shown in FIG. 2 confirming the formation of magnetite: $Fe_2O_3$. Its thermal stability has also been determined by the thermal gravimetric analysis, and the result is shown in FIG. 5, where a main weight loss for the material at 440° C. due to the decomposition of rGO/$Fe_2O_3$ material can be seen. It can be also seen that after removal of GO, around 25-30% of $Fe_2O_3$ is remaining.

During the reduction of GO to form rGO, oxygen containing groups are being removed becoming rGO less hydrophilic; the presence of $Fe_2O_3$ makes rGO/$Fe_2O_3$ more hydrophilic due to the presence of OH groups on the surface (due to the reaction of the oxide with water). The OH groups are strong ligands able to attract hard ions like $Na^+$ and $Cl^-$.

The rGO/Fe$_2$O$_3$ material of the disclosure has shown in definitive to have the advantages that in general, a desirable CDI electrode material should possess, such as high specific surface area for ionic accumulation, reasonable pore structure for ion accessibility and electrical double layer formation, good electrolyte wettability, presence of hydrophilic groups and chemical stability.

In a further aspect the disclosure relates to a process for manufacturing the 3D reduced graphene oxide/Fe$_2$O$_3$-electrode of the disclosure comprising the following steps:
a) mixing the rGO/Fe$_2$O$_3$ material, a binder and an organic solvent to obtain a slurry;
b) coating said slurry obtained in a) on a current collector;
c) drying the coated current collector obtained in b) to obtain the 3D rGO/Fe$_2$O$_3$-electrode.

In a particular embodiment the rGO/Fe$_2$O$_3$ material of the disclosure, a binder and a solvent are contacted and mixed to render the slurry. Mixing can be performed in any conventional way, e.g. by stirring, until slurry is obtained. In a particular embodiment an ultrasonicator is used, during 5 to 10 hours.

The resulting slurry comprises between 75-95% rGO/Fe$_2$O$_3$ material and 5-25 of a binder, preferably 80-95% of rGO/Fe$_2$O$_3$ material and 5-20% of binder. In a particular embodiment the slurry comprises 90% of rGO/Fe$_2$O$_3$ material and 10% of binder.

Useful non-limiting binders according to the disclosure can be, among others, polytetrafluoroethylene (PTFE), polyvinylpirrolidone (PVP), polyvinylidene fluoride (PVdF) and polyvinylalcohol (PVA). In a particularly preferred embodiment the binder is polyvinylalcohol (PVA).

Useful organic solvents can be selected depending on the nature of the binder. Non-limiting examples of suitable solvents are: N,N-dimethylacetamide and alcohols, such as ethanol and propanol, as well as mixtures of these solvents with water. According to a preferred embodiment the solvent is ethanol The slurry is then coated on a current collector. Non-limiting examples of current collectors that can be used in the present disclosure are graphite, nickel, titanium, aluminium and copper. The current collector may be in any shape, like circle, square, rectangle, etc. In a particular embodiment the current collector is a sheet, a thin film, foil, or plate. The coating of the slurry on the current collector may be carried out by any conventional method such as dip coating, spray coating, knife coating, doctor blade coating, spin coating and the like.

The current collector may have in principle any area, for example from 1 to 10 cm$^2$, such as 2.5 cm$^2$, 5 cm$^2$, 7.5 cm$^2$ or 9 cm$^2$. The thickness of the current collector may vary within a wide rage, and is typically of between 100 and 400 µm. In a preferred embodiment a graphite sheet is used, for example a graphite sheet acquired from Graphtec Int.

Drying is carried out to remove the organic solvent, typically overnight, and for example in an oven at 50 to 80° C., such as 60° C.

The thickness of the 3D reduced graphene oxide/Fe$_2$O$_3$-electrode of the disclosure is not particularly limited, and may be within a broad range. In a particular embodiment the thickness is from 200 µm to 750 µm, and more particularly from 250 µm to 450 µm, such as 300 µm, or 350 µm or 400 µm.

The present disclosure relates in another aspect to a 3D rGO/Fe$_2$O$_3$-electrode obtained by the process above disclosed.

The 3D rGO/Fe$_2$O$_3$-electrode, hereinafter also referred to as the electrode of the disclosure, comprises thus (i) a current collector and (ii) a layer obtained by coating the current collector with the slurry according to step b) and subsequent drying according to step c), as disclosed previously.

The obtained layer comprises between 75-95% rGO/Fe$_2$O$_3$ material and 5-25 of a binder, preferably 80-95% of rGO/Fe$_2$O$_3$ material and 5-20% of binder. In a particular embodiment the layer comprises 90% of rGO/Fe$_2$O$_3$ material and 10% of binder.

The current collector of the electrode of the disclosure is as disclosed previously.

Due to the similar working principle of a supercapacitor and capacitive deionization, cyclic voltammetry (CV) is used to evaluate the potential possibility of materials used for supercapacitor as well as capacitive deionization and thus the electrochemical properties such as specific capacitance can be obtained. Accordingly to examine the electrochemical properties of the electrode of the disclosure and to examine electrical double layer formation, cyclic voltammetry (CV) measurements were done as disclosed below (see Examples).

The results obtained show that in all of the CV curves at the voltage range studied, no oxidation or reduction peaks of the metals were observed; the curves were close to an ideal rectangular shape suggesting the ideal electrical double-layer (EDL) formation at the electrode-solution interface rather than Faradaic reactions and that the electrodes have a good rate performance and a low internal resistance. EDL formation is the base of capacitive energy storage and also the mechanism by which salt ions are immobilized and extracted from saline water.

The electrochemical characterization of the electrodes of the disclosure and the results obtained permit to conclude that the process of the disclosure for obtaining the rGO/Fe$_2$O$_3$ material, is key to obtain the suitable structure because it allows creating structures that combine a large number of mesopores and macropores for ion immobilization with a designed network of mesopores which provide better transport pathways and guarantee huge space for ion accommodation in CDI processes. In addition, the presence of nanoparticles of Fe$_2$O$_3$ enhance the hydrophilicity and the formation of the double layer The electrodes of the disclosure were also studied by the electrochemical impedance spectroscopy (EIS) analysis technique which is widely employed to estimate the conductivity and electrical energy storing for the CDI electrodes (see Examples).

In still another aspect the disclosure relates to a capacitive deionization device comprising at least an electrode of the disclosure for removal of ions from a fluid, such as saline water.

According to a particular embodiment the capacitive deionization device of the disclosure includes an electrode of the disclosure as a cathode, or as an anode, or includes two electrodes of the disclosure as the cathode and the anode each. In preferred embodiment the cathode and the anode are electrodes according to the present disclosure in parallel disposition, and a spacer is disposed between the cathode and the anode.

The spacer disposed between the pair of electrodes may form a path (i.e., a flow path) through which a fluid flows between the electrodes, and includes an electrically insulating material which prevents a short-circuit between the electrodes.

The spacer may be formed of any material for forming a flow path and preventing an electrode short-circuit, and may have any structure. As a non-limiting example, the spacer may have an open mesh, non-woven fabric, woven fabric, or foam shape. As a non-limiting example, the spacer may include polyethylene terephthalate, polypropylene, polyethylene, polytetrafluoroethylene, nylon, polystyrene and polyvinyl chloride. The thickness of the spacer is not particularly limited, but it may range from 500 μm to 1300 μm, for example 800 μm to 1000 μm, in light of the flow amount and the solution resistance. The open area of the spacer may range from about 20% to about 80%, for example, about 30% to about 50%, in light of the flow amount and the solution resistance.

The electrodes are situated in a CDI cell.

The CDI device of the disclosure may comprise one or more pairs of electrodes of the disclosure assembled in stacks of pair of electrodes.

Yet in a further aspect the disclosure relates to a method of removing ions from a fluid using the capacitive deionization device of the disclosure.

Specifically, the method includes treating the fluid by providing a capacitive deionization device of the disclosure, as above defined, and applying a voltage to the electrodes while supplying an ion-containing fluid into the capacitive deionization device.

The method of treating the fluid may further include desorbing ions adsorbed in the electrodes by short-circuiting the electrodes or applying a reverse voltage to the electrodes.

The details of the capacitive deionization device are the same as described above.

The ion-containing fluid supplied into the capacitive deionization device is not particularly limited, but for example, it may be sea water, brackish water or it may be hard water containing calcium ions or magnesium ions. The flow rate of supplying the fluid is not particularly limited, but may be adjusted as required. For example, the flow rate may range from about 5 to about 50 ml/min.

When a constant voltage is applied to the electrodes while supplying the fluid, the ions present in the fluid are adsorbed onto the surface of the electrodes. The applied voltage may be appropriately selected in order to obtain a high salt adsorption while minimizing side reactions such as water electrolysis. The applied voltage may be about 1.23 V or lower; for example, it may range from about 0.80 V to about 1.22 V. In a particular embodiment is 1.20 V. When applying the voltage, the ion electrosorption capacity, as calculated from the measurement of the ion conductivity of the fluid, may be about 1 mg/g or higher depending on the initial concentration of the fluid, for example, about 40 mg/g or higher, preferably about 100 mg/g, more preferably about 500 mg/g.

The aforementioned capacitive deionization device and the aforementioned methods may find utility in most home appliances using water, for example, a washing machine, a dish washer, a refrigerator, a water softener, or the like, and may also be used in an industrial water treatment device such as for seawater and brackish water desalination and ultrapure water manufacture.

The aspects of the present disclosure are illustrated below by reference to the examples and figures which are intended to be only illustrative and are not construed to limit the present disclosure in any way.

EXAMPLES

General

Scanning Electron Microscopy: The surface morphology of the 3D rGO/$Fe_2O_3$ material and the distribution of the iron nanoparticles were studied with a Quanta FEG 250 scanning microscope.

XRD: The phase and crystallinity of the materials were investigated using a XRD Bruker D8 Advanced X-ray diffractometer.

Brunauer-Emmett-Teller (BET) method: The porosity characterisation studies were performed using the gas adsorption-desorption ASAP 2010 Micromeritics equipment. The Brunauer-Emmet-Teller (BET) specific surface area and pore size distribution determination was based on the quantification of the adsorbed gas quantity to form a monolayer on the solid surface. Also, the micropores volume was calculated by t-plot method and the mesopores by difference. Volume distribution of mesopores was done by Barrett, Joyner, and Halenda (B.J.H.) method.

Raman spectroscopy: The reduction of graphene oxide (GO) was examined by Raman spectroscopy. The Raman spectra were obtained using a Renishaw in Via Raman microscopy with a laser wavelength of 488 nm and spot size of 0.5 nm.

Thermogravimetric analysis: The thermal stability of rGO/$Fe_2O_3$ material was determined by the thermal gravimetric analysis using a TG-DTA 92 thermogravimetric analyzer (TGA) with a heating rate of 3° C./min under dry air.

Cyclic voltammetry (CV): electrochemical properties of the prepared electrodes and examination of the electrical double layer formation were done with a conventional three electrode system using a computer controlled potentiostat/galvanostat (AUTOLAB PGSTAT302N, Metrohm) with a three-electrode cell at room temperature. The working electrode was the synthesised rGO/$Fe_2O_3$ electrode of the disclosure, the counter electrode was graphite and a reference electrode was a standard Ag/AgCl electrode.

Cyclic voltammetry measurements were performed with sweep rates of 10, 20, 30, 40, 50 and 100 mV/s in the potential range of −1 to 0.5 V in 0.1 mol/l NaCl solution. The values for specific capacitance (Cs) of the CD electrode material was calculated from the current-voltage curves according to the equation 1:

$$Cs = \frac{1}{vm} \frac{\int_{E_1}^{E_2} IdV}{V} \qquad (eq. 1)$$

where Cs is the specific capacitance (F/g), I is the response current (A), V is the potential (V), E1 and E2 are the potentials in the potential range, v is the potential scan rate (V/s) and m is the mass of the layer coated on the current collector and after it has been dried (g).

Electrochemical impedance spectroscopy (EIS) measurements were also measured by AUTOLAB PGSTAT302N in the three compartment cell. The amplitude of the alternating voltage was 0.01 V around the equilibrium potential (0 V); the data were collected in the frequency range from 10.000 Hz to 0.1 Hz.

Example 1: Synthesis of 3D rGO/$Fe_2O_3$ Material

A commercial graphene oxide (GO) water dispersion (4 mg/ml) supplied by Graphenea Company was used as starting material for the preparation of the samples.

Example 1a) 25 g of the GO water dispersion, 1 g aqueous solution of $FeSO_4 \cdot 7H_2O$ 0.5 M and $NH_4OH$ solution until the pH value reached pH=8.7, were loaded into a 200 ml Teflon lined stainless steel autoclave for hydrothermal reaction at 180° C. for 16 h. The final product was washed with water, dried for 30 min at 100° C., freeze at −80° C. and dried by lyophilisation at 63 Pascal and −10° C. for 16 h.

FIG. 2 shows the X-ray diffraction patterns of the synthesized rGO/Fe$_2$O$_3$ material, where all the diffraction peaks in the spectra indicate the formation of hematite (Fe$_2$O$_3$). No peaks corresponding to GO or rGO were observed.

Figure 4:
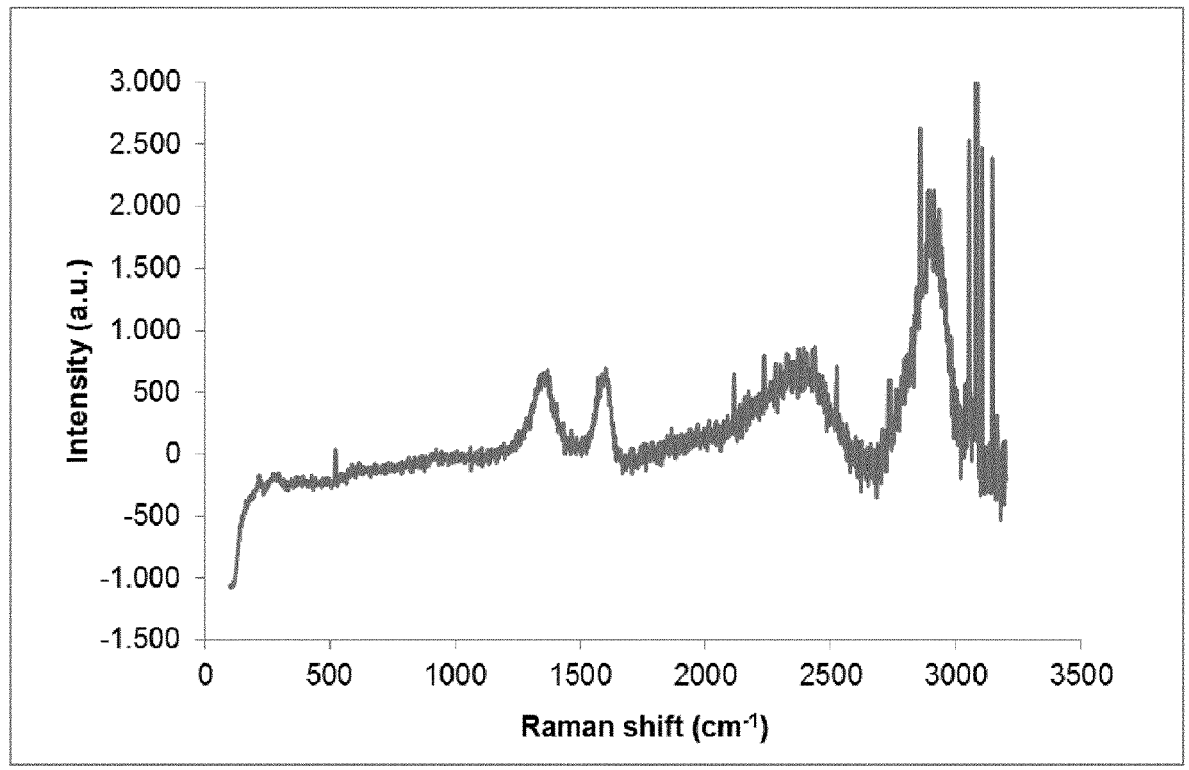

FIG. 4 shows the Raman spectra of the rGO/Fe$_2$O$_3$ material, where two remarkable peaks at about 1350 and 1603 cm$^{-1}$ appear corresponding to the well-defined D and G bands, respectively. Apparently, the D band has a higher intensity than the G band which indicates the reduction in the size of the in-plane sp$^2$ domains and also confirms the formation of graphene structure.

Example 1b) 25 g of the GO water dispersion, 1 g aqueous solution of FeSO$_4$·7H$_2$O 0.5 M and NH$_4$OH solution until the pH value reached pH=9.4, were loaded into a 200 ml Teflon lined stainless steel autoclave for hydrothermal reaction at 180° C. for 16 h. The final product was washed with water, freeze at −80° C. and dried by lyophilisation at 63 Pascal and −10° C. for 16 h.

Example 1c) 25 g GO in water dispersion and 1 g aqueous solution of FeSO$_4$·7H$_2$O 0.5 M were loaded into a 200 ml Teflon lined stainless steel autoclave for hydrothermal reaction at 180° C. for 16 h. The final product was washed with water, freeze at −80° C. and dried by lyophilisation at 63 Pascal and −10° C. for 16 h.

Example 1d) 25 g GO in water dispersion and 1 g aqueous solution of FeSO$_4$·7H$_2$O 0.5 M were loaded into a 200 ml Teflon lined stainless steel autoclave for hydrothermal reaction at 180° C. for 12 h. The final product was washed with water, freeze at −20° C. and dried by lyophilisation at 63 Pascal and −10° C. for 16 h.

Example 1e) 25 g GO in water dispersion and 1 g aqueous solution of FeSO$_4$·7H$_2$O 0.5 M were loaded into a 200 ml Teflon lined stainless steel autoclave for hydrothermal reaction at 180° C. for 16 h. The final product was washed with water, freeze with liquid nitrogen and dried by lyophilisation at 63 Pascal and −10° C. for 16 h.

Comparative example 1) 25 g GO in water dispersion and 1 g aqueous solution of FeCl$_2$·4H$_2$O 0.5 M were loaded into a 200 ml Teflon lined stainless steel autoclave for hydrothermal reaction at 180° C. for 12 h. The final product was washed with water, freeze at −20° C. and dried by lyophilisation at 63 Pascal and −10° C. for 16 h.

Example 2: Synthesis of 3D rGO/Fe$_2$O$_3$ Electrodes 3D rGO/Fe$_2$O$_3$ electrodes were prepared by mixing rGO/Fe$_2$O$_3$ material as obtained in each of the examples under Example 1, polyvinylalcohol (PVA, Tecnalia) as a binder and ethanol as solvent. The mixture was stirred in the ultrasonicator for at least 8 h until obtaining the slurry. The slurry was coated onto a graphite sheet of 2.5 cm$^2$ area (Graftech International), which acts as current collector, and dried in an oven overnight at 60° C. to remove the organic solvent and to form a layer on the graphite sheet.

Thereafter, the composition of the layer of each of the electrodes was 90 wt % of rGO/Fe$_2$O$_3$ material and 10 wt % of PVA.

Example 3: Electrochemical Characterization of the Electrodes Prepared in Example 2

Figure 6:
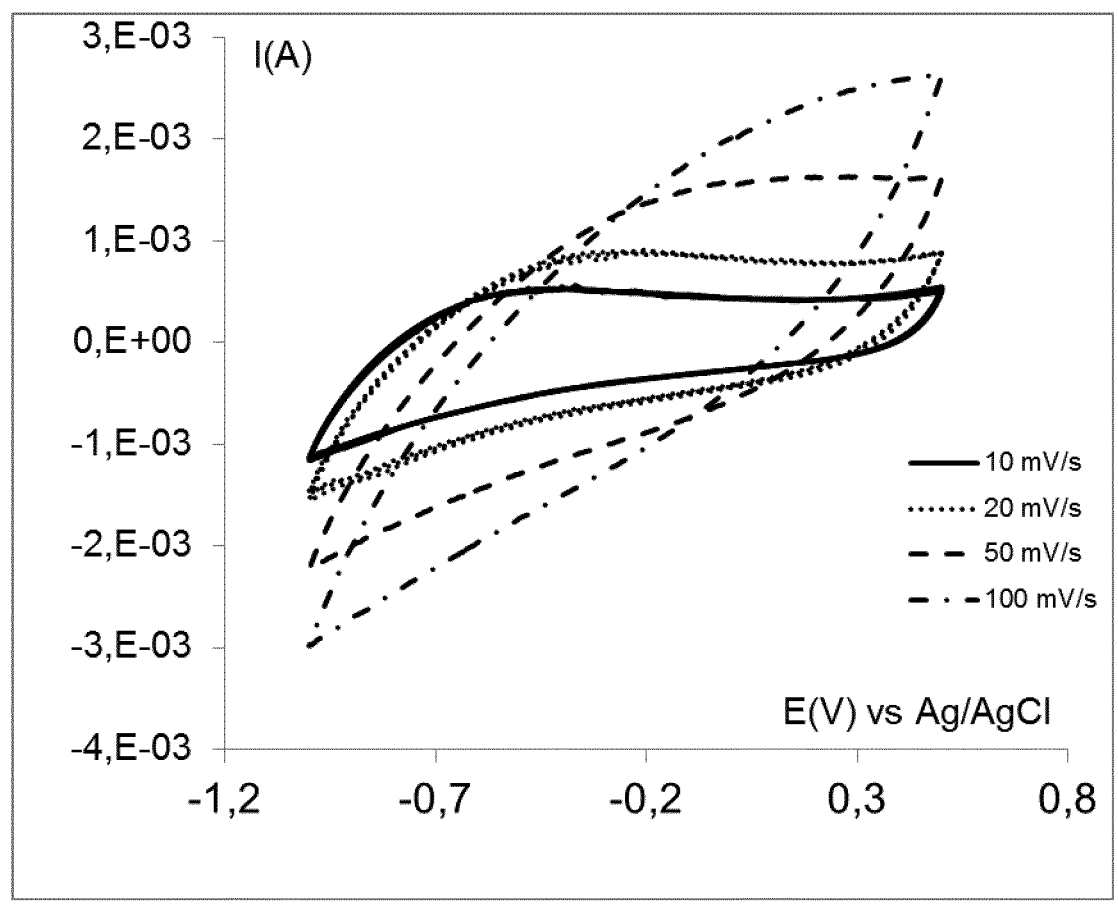
FIG. 6: shows the cyclic voltammetry results of the rGO/$Fe_2O_3$ electrode of the disclosure using the material of example 1a at different scan rates

Cyclic voltammetry measurements of the rGO/Fe$_2$O$_3$ electrodes of the disclosure as prepared in Example 2, at 10, 20, 30, 40, 50 and 100 mV/s scan rate in 0.1 M NaCl solutions, were done in a potential window of −1 to 0.5 V using a potentiostat (Autolab PGSTAT302N, Metrohm) with a three-electrode cell at room temperature. The working electrodes were the rGO-Fe$_2$O$_3$ electrodes synthesized in Example 2 using the rGO/Fe$_2$O$_3$ materials of Example 1, whereas as counter and as reference electrodes a graphite and a standard Ag/AgCl electrodes were employed respectively. (See FIG. 6 showing the results obtained for the electrode prepared with the rGO/Fe$_2$O$_3$ material of example 1a). In all of the CV curves at the voltage range studied, no oxidation or reduction peaks of the metals were observed, the curves were close to an ideal rectangular shape suggesting that the perfect capacitance behaviour is due to the ideal electrical double-layer formation at the electrode-solution interface rather than Faradaic reactions.

Figure 7:
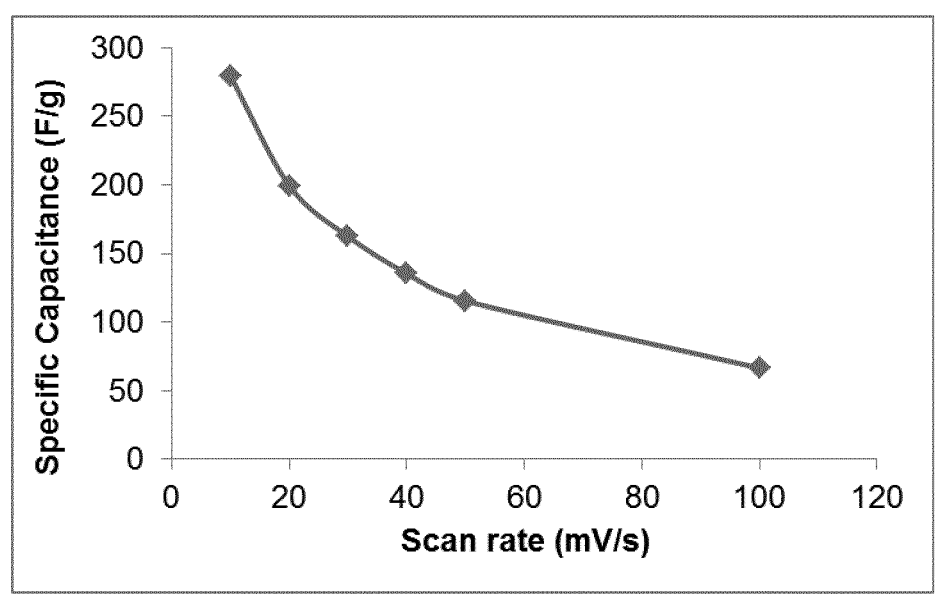

FIG. 7 shows the Cs (F/g) vs scan rate (mV/s) results of the rGO/Fe$_2$O$_3$ electrode of the disclosure prepared according to Example 2 with the rGO/Fe$_2$O$_3$ material prepared according to Example 1a. It can be observed than when the scan rate decreases, the specific capacitance of the rGO/Fe$_2$O$_3$ electrode dramatically increases from 67 F/g at 100 mV/s to 280 F/g at 10 mV/s.

These results indicate that the electrode of the disclosure with rGO and Fe$_2$O$_3$, improves the specific capacitance value and as consequence an increase of the electrosorption capacity is obtained compared to a corresponding electrode without nanoparticles. The present inventors consider that the good specific capacitance obtained could be due to the fact that iron oxide is hydrophilic and that the OH groups present interact with Na$^+$ and Cl$^-$ ions. OH groups can be protonated or deprotonated by varying the pH. At low scanning rates, the salt ions have enough time to diffuse into the inner pores of the electrodes, which is essential for the formation of electric double-layer (EDL), therefore, more ions are adsorbed on the surface of the electrodes. With the increase of the scanning rate, there is not enough time for the salt ions to move and accumulate into the inner pores. As a result, the accessible area is reduced and the formation of EDL is incomplete.

The following values were obtained:

Example 3a) The specific capacitance value obtained with the rGO/Fe$_2$O$_3$ material of Example 1a) was 280 F/g at 10 mV/s scan rate.

Example 3b) The specific capacitance value obtained with the rGO/Fe$_2$O$_3$ material of Example 1b) was 201 F/g at 10 mV/s scan rate.

Example 3c) The specific capacitance value obtained with the rGO/Fe$_2$O$_3$ material of Example 1c) was 250 F/g at 10 mV/s scan rate.

Example 3d) The specific capacitance value obtained with the rGO/Fe$_2$O$_3$ material of Example 1h) was 235 F/g at 10 mV/s scan rate.

Example 3e) The specific capacitance value obtained with the rGO/Fe$_2$O$_3$ material of Example 1g) was 255 F/g at 10 mV/s scan rate Comparative Example 3) The specific capacitance value obtained with the rGO/Fe$_2$O$_3$ material of comparative Example 1) was 171 F/g at 10 mV/s scan rate.

Figure 8:
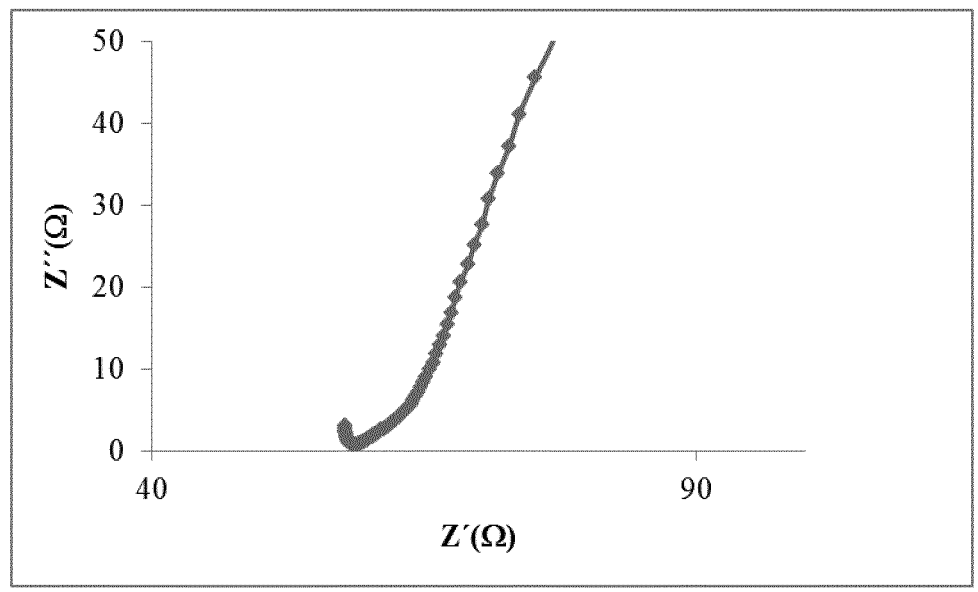

The electrochemical impedance spectroscopy (EIS) analysis technique has been employed to examine the inner resistivity of the rGO/Fe$_2$O$_3$ electrode of the disclosure as prepared in Example 2 using the material synthesized in Example 1a. FIG. 8 displays the Nyquist impedance plot of the electrode at 0.1 M NaCl concentration exhibiting two contributions: 1) a small quasi-semicircle that appears at high frequency that corresponds to a parallel combination of the charge-transfer resistance and double layer capacitance and it results from the electrical connection between the layer deposited and dried on the graphite sheet and the graphite sheet and the resistance of the said layer, and 2) a straight spike line (with comparable slopes of ~45°) at the low frequency region that represents the Warburg impedance, which depends on the kinetics of the ion diffusion in solution, as well as, on the adsorption of ions onto the surface of said layer. That is, the rGO-Fe$_2$O$_3$ electrode has a high conductivity resulting in a decrease in the energy cost, which is quite beneficial for the electrosorption of the ions onto the electrode. In consideration of the low resistance and high specific surface area, the electrode of the disclosure shows great potential for CDI application.

Example 4: CDI Device and Electrosorption Capacity Experiments

To investigate the electrosorptive capacity of rGO/Fe$_2$O$_3$ electrodes, batch mode experiments were carried out in a continuously recirculating system including an electrosorptive CDI unit cell, two reservoirs, a peristaltic pump (Fisher Scientific, Mini-pump variable flow), a conductivity meter (Hanna Microprocessor Conductivity/TDS meter) and external power supply (DC Lab Power supply LABPS1503).

First rGO/Fe$_2$O$_3$ electrodes were fabricated as disclosed in Example 2 with the rGO/Fe$_2$O$_3$ material of example 1a, except that the size of these electrodes was 9 cm$^2$ (3 cm×3 cm). The mass of the layer after coating and drying the slurry was between 0.05 to 0.08 g. Prior to the assembly of the rGO/Fe$_2$O$_3$ electrodes in a CDI unit cell, these were immersed in a NaCl solution, for at least 24 h, for equilibrium to be reached after physical adsorption of the salty ions.

A CDI unit cell was then fabricated comprising two rGO/Fe$_2$O$_3$ electrodes, an anode and a cathode, situated parallel to each other, and separated by a non-electrically conductive spacer of polytetrafluoroethylene (PTFE) material of thickness 1 mm. It prevented electrical short circuit and allowed water to flow along the electrodes.

In each experiment, diverse solutions of NaCl were employed as the target solutions with a total volume each of 100 ml. Their initial concentrations were 14129, 8691, 6396, 3495, 2855, 2621, 1687, 1114 and 676 mg/l. The flow rate was 7.7 ml/min and the applied voltage 1.2 V.

The initial conductivity of NaCl solutions varied between 924 µS/cm and 16460 µS/cm corresponding to 676 mg/l and 14129 mg/l concentrations, respectively, and the solution temperature was kept at 25° C.

Figure 9:
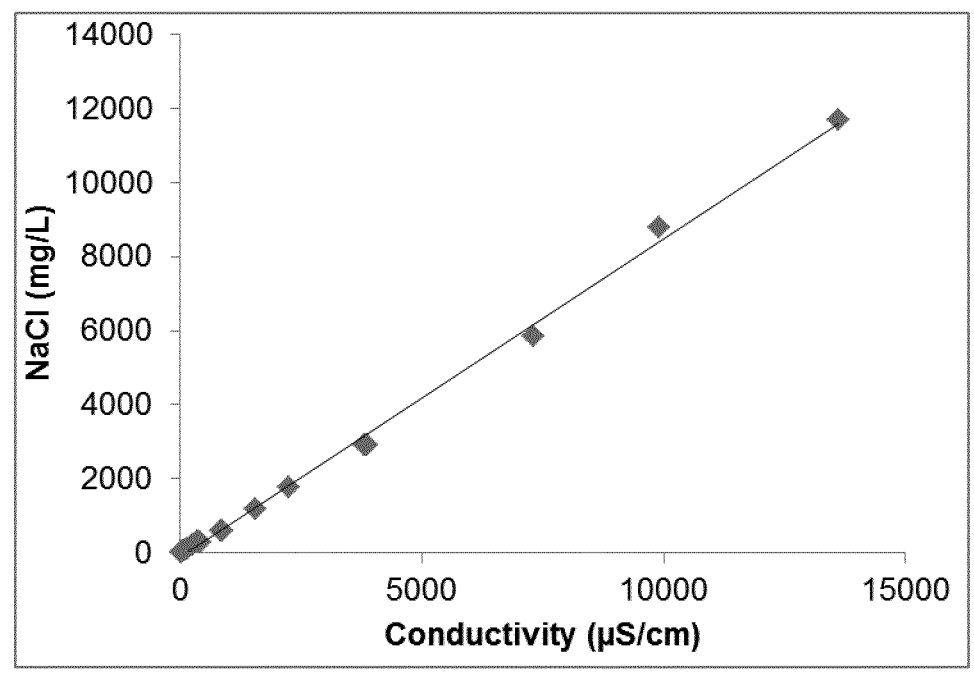
FIG. 9: shows the relationship between NaCl solutions concentration and the conductivity used for the calculation of NaCl electrosorption.

During the experiment, the conductivity was continuously monitored and converted to the sodium chloride concentration (mg/l) in order to calculate the adsorbed ions in the electrode. The relationship between concentration and conductivity was obtained according to a calibration curve made prior to the experiment. The linear relationship between NaCl solutions and its conductivity can be calculated from FIG. 9.

Therefore, the on-line NaCl concentration could be calculated from the instant conductivity of flowing water and the deionization capacity could be obtained.

In order to calculate the salt electrosorption capacity SAC (mg/g) of the CDI electrodes at different initial concentrations of NaCl solutions, i.e. the amount of adsorbed salt ions per unit weight of the electrode, it was applied a fixed cell voltage and maintained until the cell charging was complete and salt concentration was constant through the cell. The salt electrosorption capacity was calculated via the equation:

$$SAC = Q = \frac{(C_0 - C_t)v}{m}$$

$C_0$ (mg/l) is the initial concentration, $C_t$ (mg/l) is the instantaneous concentration at time t (min) in equilibrium, v (L) is the solution volume and m (g) is the total mass of the layers of the electrodes.

Figure 10:
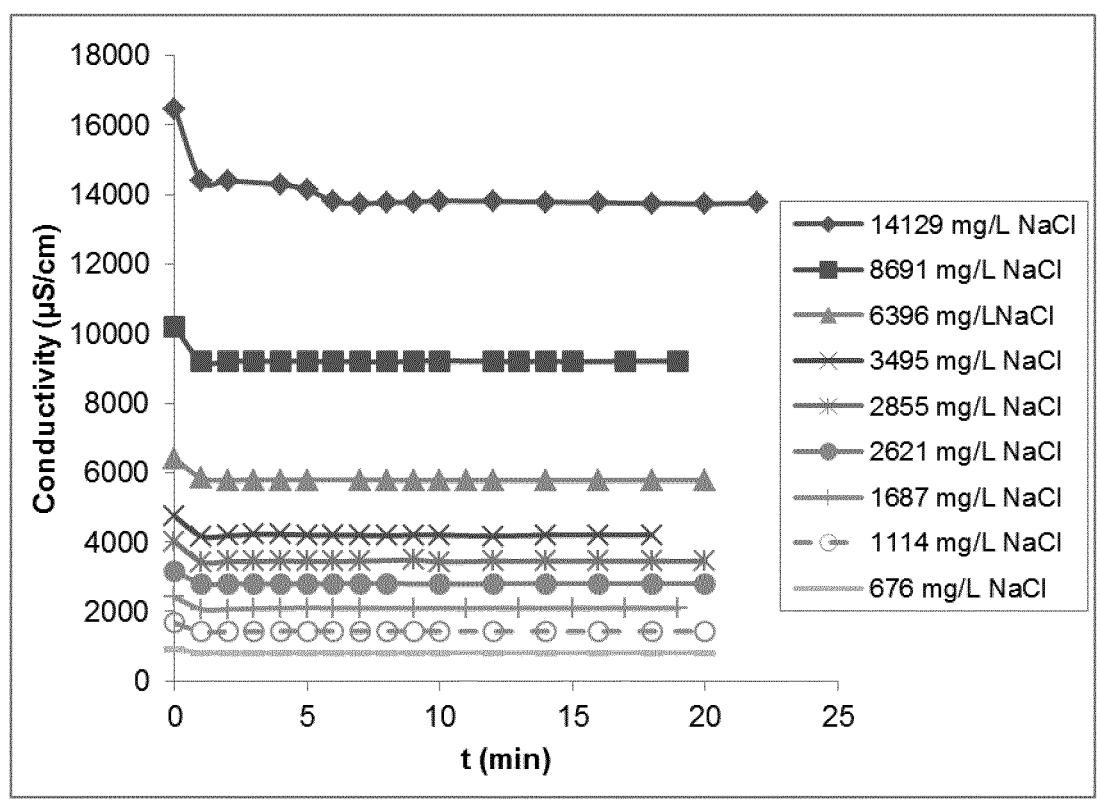

The concentration change of the NaCl was measured by a conductivity meter at the outlet of the cell, where the solution was released. When the potential is applied, Na$^+$ and Cl$^-$ ions are attracted onto the surface of the oppositely charged electrodes, causing the conductivity of the NaCl solution to decrease, as shown in FIG. 10.

A dramatic decrease in the conductivity occurs in the early stage of the process, when the concentration of the saline solution in the CDI cell undergoes a noticeable change, indicating quick adsorption of the salts ions. Conversely, in the subsequent stage, the conductivity varies more slowly until the adsorption equilibrium is reached due to the electrosorption saturation.

The data and results are shown in the following Table:

| Salt adsorption performance | | |
| --- | --- | --- |
| INITIAL CONCENTRATION OF THE DIFFERENT SOLUTIONS [NaCl] (mg/l) | Electrosorption capacity (mg/g) | Removal efficiency (%) |
| 14129 | 3178 | 16.67 |
| 8691 | 1169 | 9.96 |
| 6396 | 841 | 9.75 |
| 3495 | 654 | 12.18 |
| 2855 | 666 | 14.74 |
| 2621 | 434 | 12.26 |
| 1687 | 374 | 14.10 |
| 1114 | 278 | 15.61 |
| 676 | 130 | 14.22 |

The invention claimed is:

1. A process for obtaining a 3D reduced graphene oxide/Fe$_2$O$_3$ material, the process including the following steps:
   (i) putting in contact a graphene oxide (GO) water dispersion with an aqueous solution of only iron(II) sulfate,
   (ii) hydrothermal treatment of the resulting dispersion from previous step (i),
   (iii) freezing the reaction product obtained in step (ii) at a temperature ≤−5° C., and
   (iv) lyophilisation of the product obtained in step (iii).

2. The process according to claim 1, wherein the GO water dispersion and the iron (II) sulfate aqueous solution are mixed in a weight ratio of GO to iron (II) sulfate (FeSO$_4$) of between 1:0.2 and 1:20.

3. The process according to claim 1, further including a step of raising the pH value of the resulting dispersion of GO and iron (II) sulfate obtained in step (i) to a pH equal to or lower than 10.

4. The process according to claim 3, where the pH value is raised with an NH$_4$OH solution.

5. The process according to claim 1, further including a step of washing the reaction product after step (ii) with water.

6. The process according to claim 5, which further comprises drying the washed reaction product.

7. The process according to claim 1, wherein the freezing in step (iii) is at −80° C.

8. The process according to claim 1, wherein the hydrothermal treatment is carried out at temperatures equal or higher than 90° C., and during 10 h to 20 h.

\* \* \* \* \*